Figure 5:
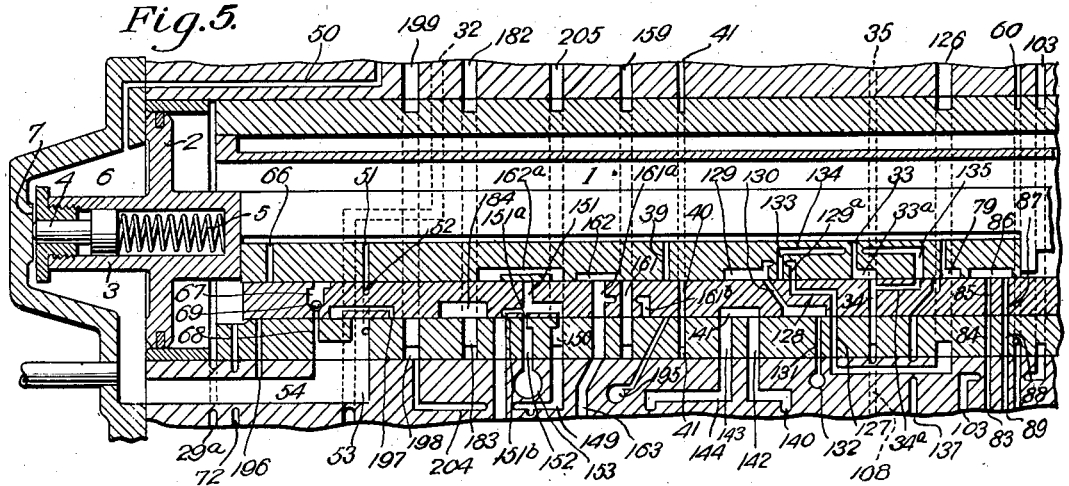

Sept. 28, 1926. 1,601,589
W. ASTLE
CONTROL VALVE FOR AIR BRAKE APPARATUS
Filed March 11, 1925 6 Sheets-Sheet 1

INVENTOR
William Astle
BY
ATTORNEYS

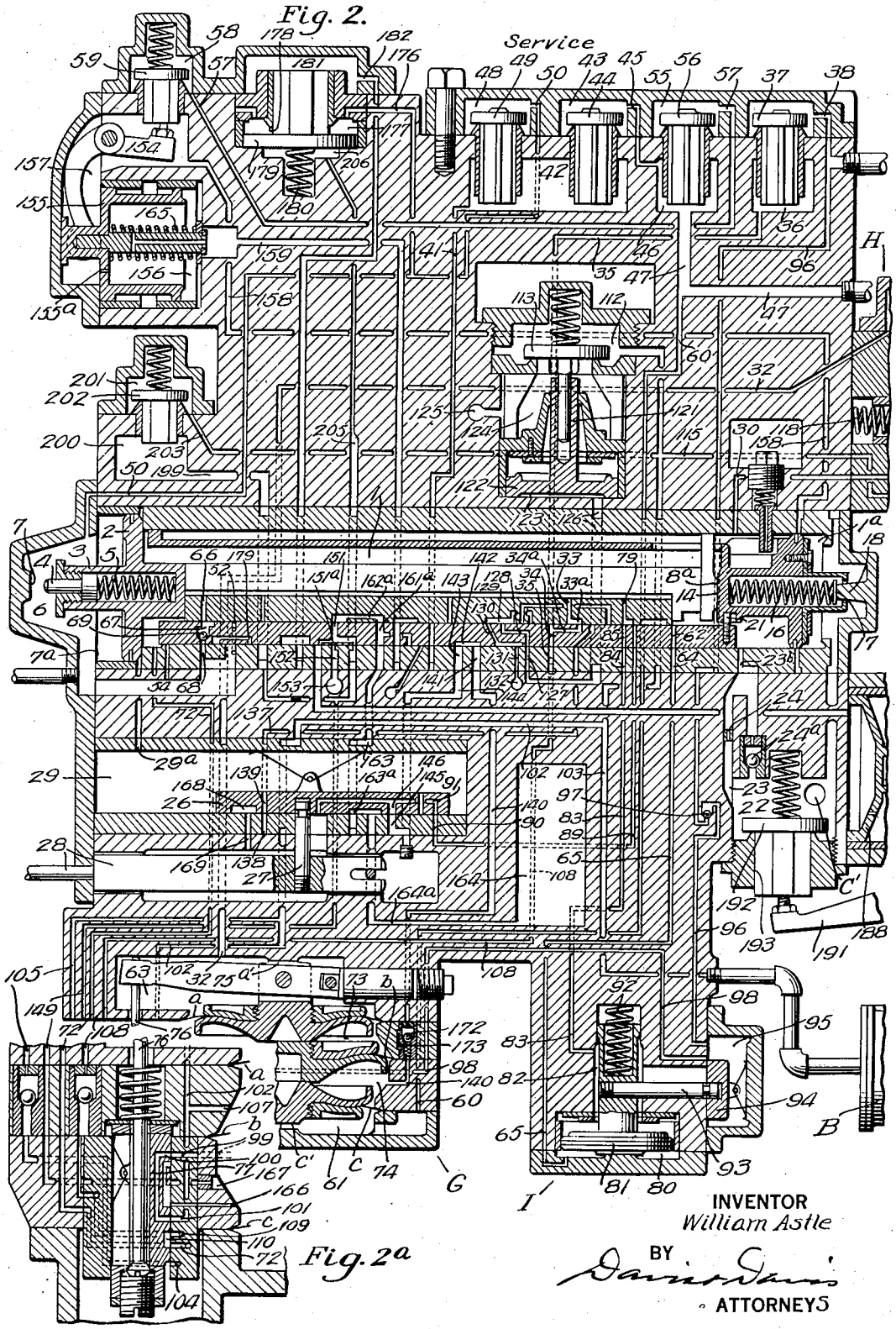

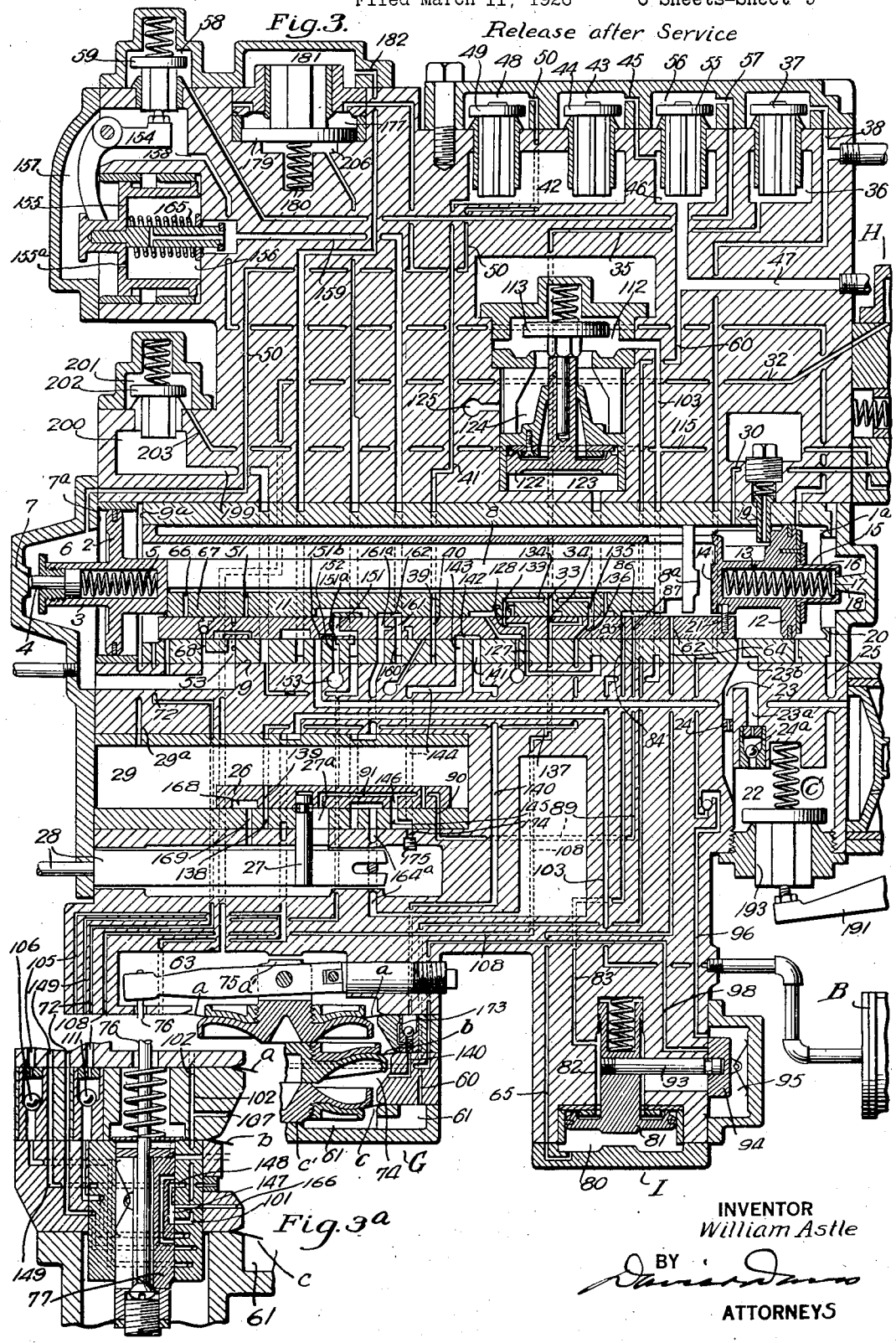

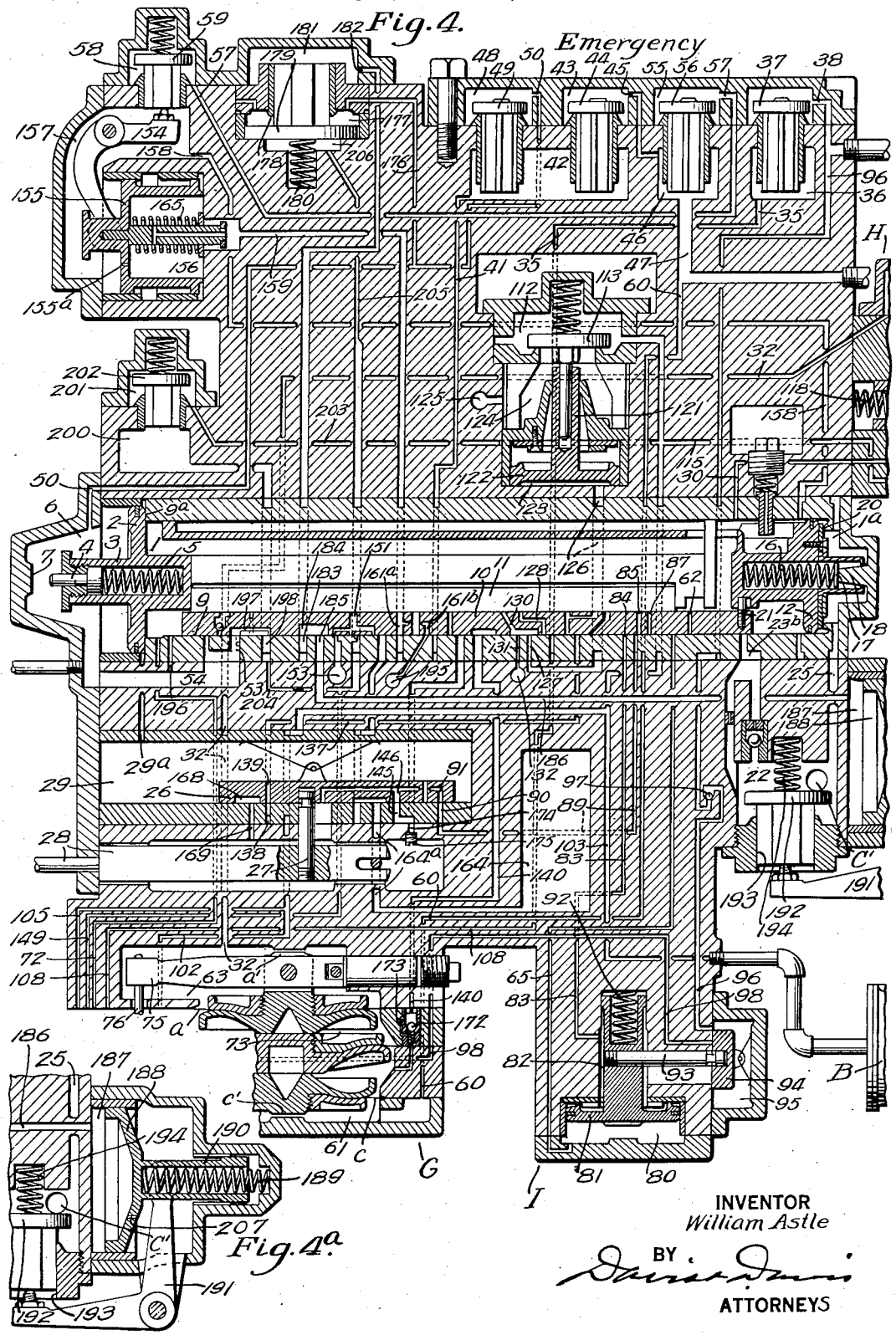

Sept. 28, 1926.

W. ASTLE 1,601,589

CONTROL VALVE FOR AIR BRAKE APPARATUS

Filed March 11, 1926 6 Sheets-Sheet 5

INVENTOR
William Astle.
BY
ATTORNEYS

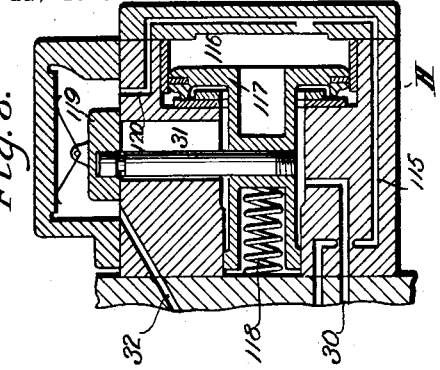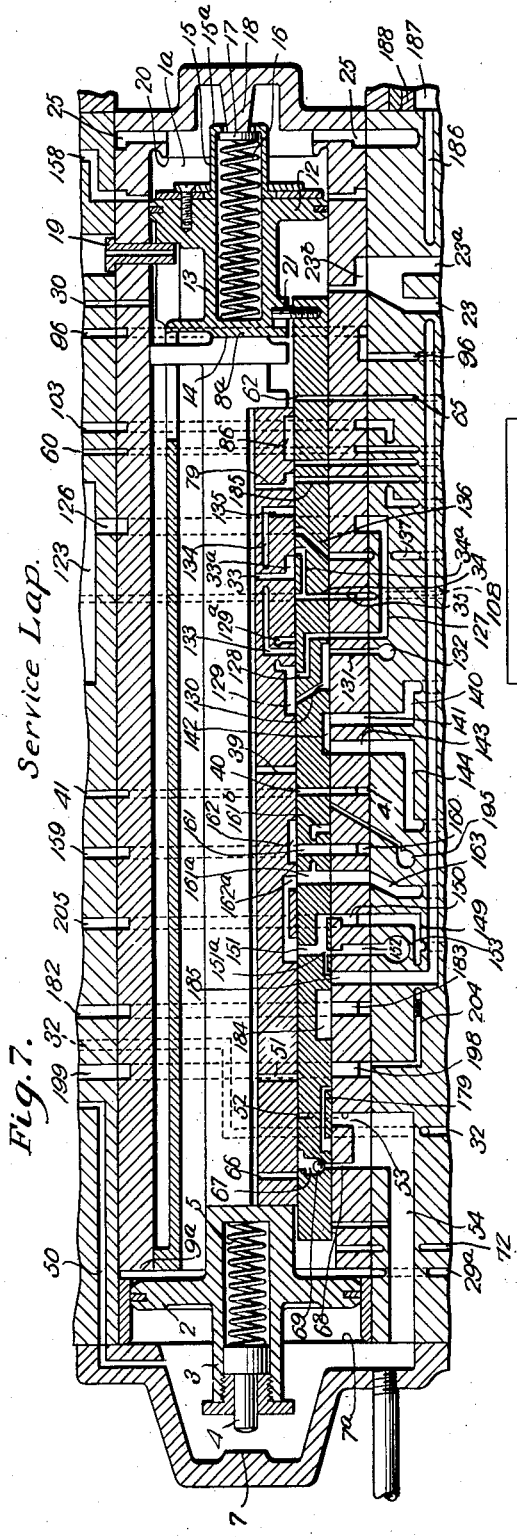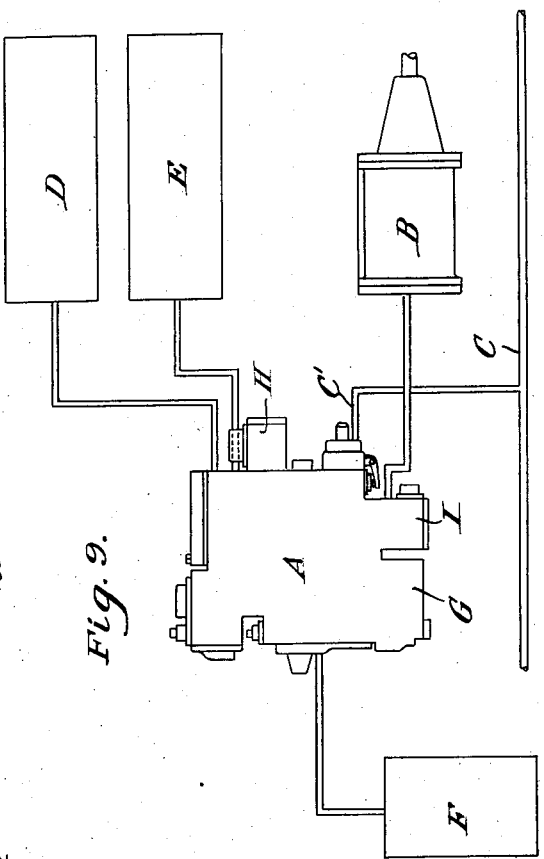

Patented Sept. 28, 1926.

1,601,589

UNITED STATES PATENT OFFICE.

WILLIAM ASTLE, OF BROOKLYN, NEW YORK, ASSIGNOR TO AUTOMATIC STRAIGHT AIR BRAKE COMPANY, OF WILMINGTON, DELAWARE, A CORPORATION OF DELAWARE.

CONTROL VALVE FOR AIR-BRAKE APPARATUS.

Application filed March 11, 1926. Serial No. 93,982.

This invention relates to a control valve for an air brake apparatus in which a service reservoir and the brake pipe supplies air for service applications of the brakes and an emergency reservoir supplies air for emergency applications of the brakes, an auxiliary reservoir being provided to supply air pressure for moving the operative parts of the control valve in service and in emergency applications of the brakes, said auxiliary reservoir also being connected to the brake cylinder in emergency applications of the brakes. The control valve embodies a pilot valve; a service feed valve; an equalizing valve; a combined quick release and emergency valve; an emergency brake pipe vent valve; and a manually operable release-governing valve.

In the control valve casing is arranged a main slide valve and a supplemental slide valve. The supplemental slide valve controls the charging of the system and when in service position controls the operation of the various mechanisms operating in service applications. The main valve remains stationary during service applications and in charging and only moves in emergency applications. In emergency application position the main slide valve controls the operation of the various mechanisms and devices for causing an emergency application.

The pilot valve operates upon a service reduction of brake pipe pressure to connect the service reservoir and the brake pipe to the brake cylinder. When the desired brake cylinder pressure is built up in the brake cylinder the pilot valve is moved to lap position. The supplemental slide valve moves to service position upon a service reduction of brake pipe pressure and this movement results in the operation of the service feed valve which connects the service reservoir to the pilot valve. The pilot valve is so constructed that it will build up a brake cylinder pressure in a direct ratio to the brake pipe reduction. Upon an increase in brake pipe pressure, after a service application of the brakes, the pilot valve will move to release position and will exhaust brake cylinder pressure in a direct ratio to the increase in brake pipe pressure. By means of the pilot valve the brake cylinder pressure may be graduated on and off in steps in response to reductions of and increases in brake pipe pressure.

The service feed valve controls communication between the service reservoir and the pilot valve and is controlled in its operations by the movements of the supplemental slide valve. The equalizing valve operates when there has been an equalization of brake pipe and brake cylinder pressure and prevents the reduction of brake cylinder pressure below the point of equalization when the brake pipe pressure has been reduced below that point. The combined quick release and emergency valve operates upon an increase in brake pipe pressure to admit a portion of the emergency reservoir pressure to the brake pipe for a quick release of the brakes, when the release governing valve is in quick release position. When the main slide valve is in emergency position the combined quick release and emergency valve is opened to permit emergency reservoir air to flow to the main slide valve chamber and from said chamber to the brake cylinder for an emergency application of the brakes.

The main objects of this invention are:

1st: To provide a control valve for air brake apparatus which, in service application position, will connect a service reservoir and the brake pipe to the brake cylinder for a service application of the brakes;

2nd: To provide a control valve for air brake apparatus which, in emergency position, will connect an emergency reservoir and an auxiliary reservoir to the brake cylinder, the service reservoir being sealed;

3rd: To provide a control valve for air brake apparatus wherein the main slide valve in emergency position will permit auxiliary reservoir air to open the brake pipe vent valve. The main slide valve in emergency position also brings about the opening of the combined quick release and emergency valve to permit emergency reservoir air to flow to the main slide valve chamber and from said chamber to the brake cylinder;

4th: To provide a control valve for air brake apparatus having an equalizing valve which will operate upon an equalization of brake pipe and brake cylinder pressures to cut off the brake pipe from the actuating chamber of the pilot valve and to connect the brake cylinder to said chamber, thereby preventing the drawing down of the brake cylinder pressure with the brake pipe pressure when the latter pressure is reduced below equalization;

5th: To provide a control valve for air brake apparatus with a pilot valve subject to brake pipe, brake cylinder and emergency reservoir pressures and by means of which brake cylinder pressure may be graduated on and off in steps in response to variations of brake pipe pressure and which will operate to build up brake cylinder pressure during cycling operations;

6th: To provide a control valve for air brake apparatus with a service feed valve operating upon a service reduction of brake pipe pressure to connect the service reservoir to the pilot valve for service application of the brakes, said service feed valve sealing the service reservoir in emergency applications of the brakes;

7th: To provide a control valve for air brake apparatus with a combined quick release valve and emergency valve, said valve operating upon an increase of brake pipe pressure to release a portion of emergency reservoir air into the brake pipe, and operating upon an emergency reduction of brake pipe pressure to release the emergency reservoir air to the brake cylinder for an emergency application of the brakes;

8th: To provide a control valve for air brake apparatus with means for retarding the recharging of the reservoirs and restricting the release of brake cylinder pressure when there is an excessive brake pipe pressure.

There are other important objects and advantages of the invention, all of which will appear hereinafter.

In the drawings:—

Figure 6:
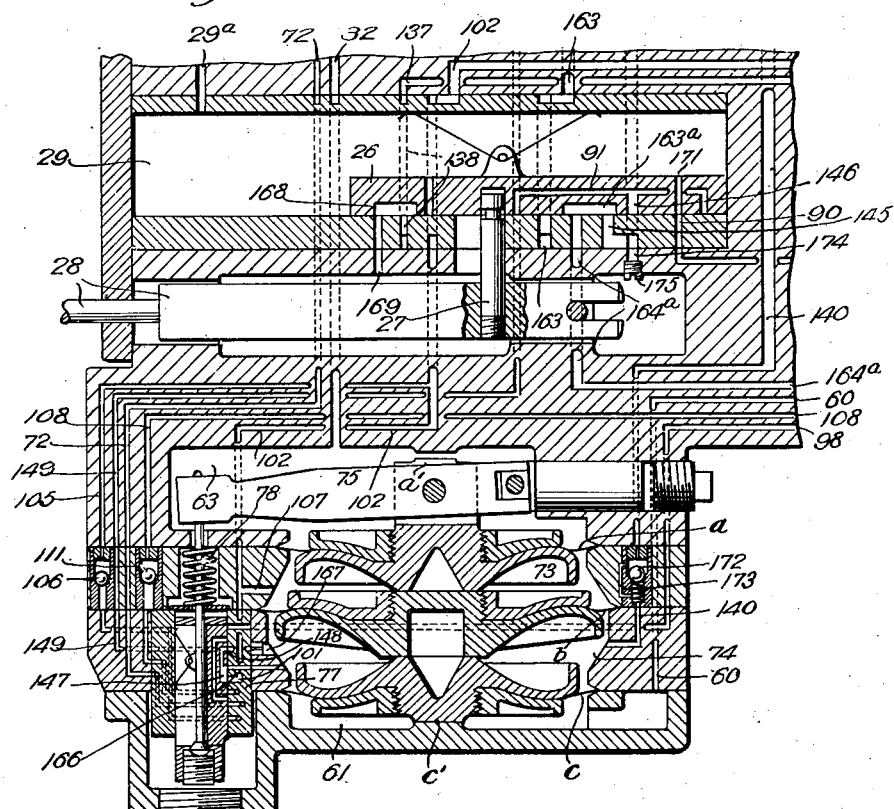

Fig. 1 is a diagrammatic sectional view showing the parts of the control valve in full release and charging position;

Fig. 1ª a detail sectional view of the pilot valve in lap position;

Fig. 2 a diagrammatic view similar to Fig. 1 showing the parts in service application position;

Fig. 2ª a detail sectional view of the pilot valve in service position;

Fig. 3 a view similar to Fig. 2, the parts being shown in release position after a service application;

Fig. 3ª a detail sectional view of the pilot valve in release position;

Fig. 4 a view similar to Fig. 3 showing the parts in emergency position;

Fig. 4ª a detail sectional view of the emergency brake pipe vent valve;

Fig. 5 a detail diagrammatic sectional view of the main and supplemental slide valves in retarded release and restricted recharging position;

Fig. 6 a detail diagrammatic view showing the release governing valve in graduated release position and the pilot valve in release position;

Fig. 7 a view similar to Fig. 5 showing the supplemental slide valve in service lap position;

Fig. 8 a detail sectional view of the equalizing valve in the position which it assumes when brake pipe pressure is below brake cylinder pressure; and Fig. 9 a diagrammatic view of the control valve, its associated reservoirs and the brake pipe and brake cylinder.

In order to simplify the description of the control valve and its operations, the various parts and the ports and passages will not be specifically described except in connection with the description of the various operations of the valve.

In the diagrammatic view Fig. 9, A designates the control valve; B the brake cylinder; C the brake pipe; D the service reservoir; E the emergency reservoir; and F the auxiliary reservoir.

In the control valve is formed a main valve chamber 1. In this chamber is arranged a main actuating service piston 2. The piston 2 separates the main valve chamber 1 from an auxiliary reservoir chamber 6 to which the auxiliary reservoir F is directly connected. The brake pipe is directly connected to the main valve chamber so that brake pipe pressure is on the inner side of the piston 2 and the auxiliary reservoir pressure is on the outer side of said piston. The piston 2 is formed with an outwardly extending tubular extension 3 in which is arranged a spring 5. Arranged in the tubular extension and directly engaging the spring 5 is a normal charging stop 4. The outer end of this spring-pressed stop is adapted to engage a rigid stop 7 to hold the piston 2 and the connected valves in normal charging position. The spring 5 of stop 4 will yield under an excessive brake pipe pressure in chamber 1 and permit the piston and the connected valves to move outwardly to restricted-charging position. The stop 4 is arranged to normally hold the piston 2 slightly inwardly from a stop wall 7ª so that an excessive brake pipe pressure will force the piston 2 outwardly against the tension of the spring 5 until said piston abuts against the rigid stop wall 7ª of the valve casing. This slight excess movement of the piston under an excessive pressure in chamber 1 is for the purpose of cutting off the charging port leading to the emergency reservoir and opening a small port which leads to the auxiliary reservoir. The charging port leading to the service reservoir remains open in both the normal charging position and in the restricted-charging position of the main and supplemental valves connected to the piston 2. This operation will be more fully hereinafter described.

The piston 2 is formed with an inwardly extending valve-engaging portion 8, said inwardly extending portion also serving as a guide for the piston and for the valve connected thereto. On the main valve seat 9 is arranged a main slide valve 10, and on top of said valve 10 is arranged a supplemental slide valve 11, this latter valve being connected to the piston 2 by the inwardly extending part 8. The valve 11 moves with the piston 2 and slides on top of the main valve 10. The inward movement of the piston 2 to service application position is positively limited by the said piston contacting with the abutment 9ª, said abutment being the end of the valve seat.

In the opposite end of the main valve chamber 1 from the piston 2 is arranged a small emergency piston 12, said piston also serving as a service stop to arrest the supplemental slide valve in service position. The piston 12 is formed with an inwardly extending, central, tubular part 13 having an inner stop wall 14 which is adapted to serve as a service stop or abutment for the supplemental valve 11. The inner guide portion 8ª of the extension 8 is adapted to engage the stop wall 14. Secured to the outer face of the piston 12 is an outwardly extending tubular extension 15 which is formed with an inwardly extending flange 15ª on its outer end. Within the tubular part 13 and the tubular extension 15 is arranged a service stop spring 16, said spring holding a washer 17 against the flange 15ª. Formed on the valve casing in axial alinement with the spring 16 is an abutment 18 which extends into the tubular part 15 and contacts with the washer 17. The spring 16 serves as a means to hold the emergency piston 12 in its inner position, a stop 19 being arranged to hold the emergency piston in its correct normal position and also serving to hold the main slide valve in its normal service and release position. The emergency piston 12 serves to separate the supplemental brake pipe chamber 1ª from the main slide valve chamber 1 and said piston carries on its outer face a gasket which, in the emergency position of the piston 12, engages an annular rib 20 and seals the supplemental brake pipe chamber from the brake pipe. The extension 13 of the piston 12 is connected by a pin 21 to the main slide valve. The pin 21 is rigidly connected to the main slide valve and extends up into a slot in the extension 13 so that the piston 12 may have a slight outward movement, that is to say toward the right hand as viewed in the drawings, without moving the main slide valve. The slot forms a lost-motion connection between the piston 12 and the main slide valve. The main slide valve remains in its normal position during all operations of the supplemental valve and only moves to emergency position as will be hereinafter described. The main valve chamber is connected to the brake pipe chamber 22 by a charging port 23ᵇ and a passage 23 in which is arranged a restriction plug 24. The purpose of this plug is to limit the reduction of brake pipe pressure in chamber 1 to a service rate. The chamber 22 is also connected to the charging port 23ᵇ of the main valve chamber by a passage 23ª. In this passage is arranged a back pressure check valve 24ª, said valve permitting air to flow freely to the main valve chamber, but preventing the flow of air from said chamber through the passage 23ª to the brake pipe chamber 22. The purpose of the passage 23ª is to permit quick charging of the main valve chamber, the restriction plug 24 preventing the reduction of pressure in the main slide valve chamber at a greater rate than a service rate reduction. The brake pipe chamber 22 is connected by a passage 25 to the supplemental brake pipe chamber 1ª. Passage 25 is not restricted, so that the pressure in chamber 1ª may be reduced at an emergency rate whenever there is an emergency reduction of brake pipe pressure in chamber 22. The brake pipe C is directly connected to the brake pipe chamber 22.

The control valve is provided with a manually operable release-governing valve which consists of a slide valve 26 connected by a stem 27 to an operating rod 28. The stem 27 extends through an operating slot 27ª. The end of the rod 28 abuts against the valve casing to limit the outer movement of the release governing valve, and the inner end of said rod abuts against a stop pin to limit the inward movement of the said valve. To place the valve 26 in quick-release position the operating rod is pulled out, as shown in Fig. 1, and to place it in graduated-release position the said rod is shoved inwardly to the limit of the slot, as shown in Fig. 6. The valve 26 is arranged in a valve chamber 29. The release-governing valve chamber 29 is connected directly to the main valve chamber 1 by passage 29ª so that brake pipe pressure will always be registered in said chamber 29.

*Release and charging.*

In charging the system brake pipe air flows through the brake pipe connection C' into the brake pipe chamber 22 and through passage 25 into the supplemental brake pipe chamber 1ª. From chamber 22 brake pipe air also flows through passages 23ª and 23 into the main valve chamber 1. The piston 2 will be moved toward the left hand, as viewed in the drawings, until normal charging stop 4 engages the abutment 7. This movement of the piston 2 will place the supplemental valve 11 in normal charging position. The emergency piston will be held against its stop 19 and the main slide valve will be held in its normal release and service application position. From the main valve chamber 1 brake pipe air will flow through port 33 in the supplemental slide valve, port 34 in the main slide valve, port and passage 35 to chamber 36. From chamber 36 the air will flow past check valve 37 and thence direct into passage 38 and into service reservoir D. The check valve 37 will prevent service reservoir air passing back from the service reservoir to the chamber 36. From the main valve chamber 1 brake pipe air will also pass through port 39 in the supplemental slide valve 11, port 40 of the main slide valve, into port and passage 41. Passage 41 leads into chamber 42. Connected to chamber 42 is a small chamber 43. A back-pressure check valve 44 is arranged between said chambers and permits air to flow from chamber 42 into chamber 43 and prevents air passing back from chamber 43 to chamber 42. Chamber 43 is connected by a passage 45 to a chamber 46, and chamber 46 is directly connected by a passage 47 to the emergency reservoir E. It is clear, therefore, that air flowing into chamber 42 will flow directly into the emergency reservoir and that the check valve 44 will prevent air flowing back from the emergency reservoir to chamber 42. Connected to chamber 42 is a small chamber 48, a back-pressure check valve 49 being arranged between said chamber 48 and the chamber 42 so that air may pass into chamber 48 but cannot flow back from said chamber 48 into chamber 42. Chamber 48 is connected by passage 50 to the auxiliary reservoir chamber 6. The auxiliary reservoir is directly connected to said chamber 6 so that said reservoir and said chamber 6 will be charged with air from chamber 42 past check valve 49 and then through passage 50.

With an excessive brake pipe pressure in chamber 1 the piston 2 will be forced to the left, compressing the normal charging spring 5 until the piston 2 engages the rigid stop wall 7ª. This will cause a movement of the supplemental slide valve toward the left and move the charging port 39 out of register with the port 40, thereby preventing the flow of air to the chamber 42 and the emergency reservoir. The port 33 is provided with an extension 33ª so that it will remain in communication with port 34 when the port 39 is out of register with the port 40, as just described. This will permit brake pipe air to flow to the service reservoir during the period of excess pressure in the main valve chamber 1. The excess movement of the supplemental slide valve toward the left, just described, will bring port 51 in the supplemental slide valve into register with port 52 of the main slide valve, and said port 52 leads into a port 53 in the main slide valve seat. Port 53 leads into a large cavity 54 which is in direct communication with chamber 6 and the auxiliary reservoir so that in the restricted-charging position of the supplemental slide valve the auxiliary reservoir and the service reservoir will be charged but the emergency reservoir will be cut off from the main valve chamber and will not be charged during the period of excessive pressure in the main valve chamber. Chamber 46 is connected to a small chamber 55, a back-pressure check valve 56 being arranged between the two chambers to prevent air flowing from chamber 55 back to chamber 46. Chamber 55 is connected by passage 57 to a chamber 58 on top of a combined quick-release and emergency valve 59. Passage 47 is connected by a passage 60 to the emergency reservoir chamber 61 of the pilot valve structure G so that emergency reservoir air will always be in chamber 61. The main slide valve chamber 1 is connected by a passage 30 to the brake pipe chamber 31 of the equalizing valve H. Chamber 31 is normally connected by a passage 32 to the actuating chamber 63 of the pilot valve structure so that brake pipe air will flow to said chambers 31 and 63 in the charging operation and will always be registered therein, except when the chamber 63 is cut off from chamber 31 as hereinafter described.

The main slide valve 10 is formed with a port 62 which, in the normal position of said valve, registers with a port 64 in the main slide valve seat. Port 64 is connected by passage 65 to chamber 80 of the service feed valve I. Brake pipe air will therefore flow, during the charging operation, from chamber 1 to chamber 80 and will be maintained in said chamber 80. In chamber 80 is arranged a service feed valve piston 81, said piston operating the service feed valve and holding said valve closed in the charging and release position of the main slide valve. Above the piston 81 is formed a chamber 82 which is connected by passage 83 to a port 84 in the main slide valve seat. In the main slide valve is formed a port 85 which in the normal position of the main slide valve registers with port 84. In the supplemental slide valve is formed a cavity 86 which in the normal release and charging position of said supplemental slide valve places the port 85 in communication with a port 87 in the main slide valve. Port 87 is in register with a port 88 in the main slide valve seat and this latter port is connected by a passage 89 to a port 90 in the seat of the release governing valve. In the quick release position of the release governing valve a port and passage 91 in said valve connects port 90 to atmosphere through the operating slot 27ª. In the release and charging position of the main and supplemental slide valves, chamber 82 of the service feed valve will be connected to atmosphere so that brake pipe pressure in chamber 80 will hold the service feed valve closed.

*Service application.*

A service application of the brakes is brought about by a service reduction in brake pipe pressure in the usual manner. A service reduction of brake pipe pressure in chamber 22 will result in a corresponding reduction of pressure in the supplemental brake pipe chamber 1ª and in the main valve chamber 1. The restriction plug 24 is for the purpose of preventing a reduction of pressure in chamber 1 at a greater rate than the usual service reduction. As hereinbefore pointed out, this is to prevent an immediate emergency reduction of pressure in the main valve chamber when there is an emergency reduction of brake pipe pressure. A service reduction of brake pipe pressure in chamber 1 will result in a movement of the piston 2 inwardly, or toward the right as viewed in the drawings, because of the auxiliary reservoir pressure on the outer or left-hand face of the piston 2. The piston 2 and the supplemental slide valve 11 connected thereto will move inwardly until the guide 8ª engages the abutment 14 of the piston 12. The abutment 14, the piston 12 and the piston 2 will continue to move against the tension of the spring 16 until the lost motion between the abutment 14 and the pin 21 is taken up. The supplemental slide valve will then be in service application position, as shown in Fig. 2. When the supplemental slide valve is in service position the piston 2 will be in engagement with the rigid stop or abutment 9ª at the left-hand end of the valve seat 9, said abutment serving as a positive fixed stop to limit the movement of the supplemental slide valve to service position. When the supplemental slide valve is in service position a port 66 of the supplemental slide valve registers with port 67 of the main slide valve. Port 67 is connected to a port 68 in the main slide valve seat, and said latter port leads into chamber 54.

In the port 67 of the main slide valve is arranged a check valve 69 which seats toward the port 68 and prevents air passing from the main slide valve chamber to port 68 and the auxiliary reservoir. When the port 66 is in register with port 67 auxiliary reservoir air may flow from port 68 into the main slide valve chamber. An open port and passage 72 leads from chamber 1 to the seat of the pilot valve. The pilot valve structure comprises an actuating diaphragm $a$; an equalizing diaphragm $b$; and an emergency diaphragm $c$. These diaphragms are suitably mounted in a casing and are parallel with each other to form a series of air chambers. The diaphragm $b$ is larger in area than the actuating diaphragm $a$ for a purpose which will hereinafter appear. Between the diaphragm $a$ and the upper wall of the valve casing is formed the actuating chamber 63. The brake cylinder pressure equalizing chamber 73 is between the actuating diaphragm $a$ and the equalizing diaphragm $b$. Between the diaphragms $b$ and $c$ is formed a retention chamber 74. The function of this chamber will be fully hereinafter described. Between the emergency diaphragm $c$ and the lower wall of the valve casing is formed the emergency reservoir chamber 61. The central supports of the diaphragms are in close engagement with each other so that the diaphragms move up and down together, or substantially so, in accordance with the variations in the controlling pressures in the chambers of the diaphragm structure. The emergency diaphragm $c$ carries a downwardly extending release stop $c'$ and the actuating diaphragm $a$ carries an upwardly extending application stop $a'$, said latter stop being arranged on the upper end of a central stem carried by the actuating diaphragm. These stops limit the movement of the diaphragms. In the actuating chamber 63 is arranged a lever 75. One end of this lever is pivoted on a rigid post secured to the wall of the actuating chamber, and the other end thereof is connected to a valve rod 76. Intermediate its ends the lever 75 is pivotally connected to the upwardly extending stop stem $a'$ so that the lever will be swung up and down by the up-and-down movements of the actuating diaphragm. On the lower end of the valve rod 76 is mounted a pilot valve 77 and said valve is held in its normal lap position by a spring 78.

In the supplemental slide valve 11 is formed a port 79 having an extension foot operating on the main slide valve seat. In the service position of the supplemental slide valve, port 79 registers with port 85 so that brake pipe pressure may flow from the main valve chamber through port 84 and passage 83 into the chamber 82 of the service feed valve. Pressure will therefore equalize on opposite sides of the piston 81 and the spring 92 will force the feed valve piston downwardly. Connected to the feed valve piston is a stem 93 which on its outer end carries the service feed valve 94 which operates in a valve chamber 95. Opening into the valve chamber 95 is a passage 96 which leads direct to the service reservoir connection 38 so that service reservoir pressure will always be registered in chamber 95. In the passage 96 is arranged a check valve 97 which seats toward the service reservoir and prevents air passing from the chamber 95 back to the service reservoir but permits a free flow of air from the reservoir to the chamber 95. When the service feed valve 94 is in its service position it uncovers a port and passage 98 which leads to port 99 in the seat of the pilot valve.

The reduction of brake pipe pressure in chamber 1 results in a corresponding reduction of pressure in the actuating chamber 63 of the pilot valve structure, air from said chamber flowing back through passage 32 to the chamber 31 of the equalizing valve and then through passage 30 to the main slide valve chamber 1. The reduction of pressure in the actuating chamber 63 results in an upward movement of the pilot valve to service position, due to the emergency reservoir pressure in chamber 61 of the pilot valve structure. When the pilot valve is in service position port 100 of said valve connects port 99 to port 101 in the pilot valve seat. This latter port is connected by passage 102 to the brake cylinder passage 103 which leads direct to the brake cylinder. In the service position of the pilot valve, service reservoir air will pass from the service feed valve chamber 95 to the brake cylinder. When the pilot valve is in service position port 104 in the pilot valve seat is uncovered thereby permitting air from the actuating chamber, and from the pilot valve chamber, to flow into said port. The actuating chamber 63 is in direct and open communication with the pilot valve chamber and port 104 opens directly into this latter chamber. It is clear, therefore, that air may flow directly from the actuating chamber and the pilot valve chamber into port 104 when said port is uncovered. Port 104 is connected by passage 105 to passage 102 so that pressure from the actuating chamber may flow direct to brake cylinder. Port 104 is of the proper capacity to permit just the right quantity of brake pipe air to flow to the brake cylinder for a service application of the brakes. In the passage 105 is arranged a check valve 106 which seats toward port 104 to prevent air passing back through passage 105 to the port 104.

Passage 102 is connected by passage 107 to the brake cylinder pressure equalizing chamber 73 so that brake cylinder pressure will be registered in said chamber. The equalizing diaphragm $b$ is larger than the actuating diaphragm $a$, and these diaphragms are so proportioned with respect to each other that the pressure in chamber 73 must be two and one-half times more than the pressure reduction in chamber 63 in order that the downward force exerted on diaphragm $b$ will be sufficient to move the pilot valve to lap position. This will result in a brake cylinder pressure of twenty-five pounds upon a ten pound brake pipe reduction in chamber 63.

Passage 35 leading to chamber 36 is connected by passage 108 to port 109 in the pilot valve seat. When the pilot valve is in service position a cavity 110 therein connects 109 to port and passage 72 so that auxiliary reservoir air may flow from the main slide valve chamber 1 into passage 108. Passage 108 is connected by passage 35 to chamber 36, and said chamber is connected to the service reservoir by passage 38. Check valve 37 is in passage 38. In the passage 108 is arranged a check valve 111 which seats toward the pilot valve and prevents air flowing back through passage 108 to the pilot valve. When the supplemental slide valve 11 moves back to lap position port 66 is moved out of register with port 67. The purpose of connecting the passage 72 of the pilot valve to passage 35 is so that if the service reservoir pressure is drawn down below the brake pipe pressure when the pilot valve is operating to compensate for brake cylinder leakage the service reservoir pressure will be built up from chamber 1. When the brake cylinder pressure leaks down the pilot valve will go to service position. In service position the service reservoir and the brake pipe will be connected to the brake cylinder. At the same time through passages 72, 108 and 35 the pilot valve will connect chamber 1 with chamber 36. If the pressure in chamber 1, which is brake pipe pressure, is superior to the pressure in the service reservoir, air will flow from chamber 36 past the check valve 37 and into the service reservoir. When the pilot valve connects passage 72 to passage 108, with the service reservoir below brake pipe pressure, there will be a drop of pressure in the main valve chamber and the supplemental slide valve will be moved to service position. This will connect the auxiliary reservoir to chamber 1, as hereinbefore described, so that pressure may flow from said reservoir into chamber 1. It is clear, therefore, that in compensating for brake cylinder leaks the pilot valve may draw upon the service reservoir, the auxiliary reservoir and the brake pipe.

The brake cylinder passage 103 leads into chamber 112 above the brake cylinder release valve 113. This valve is held to its seat by the pressure in chamber 112 and by a spring 114. The passage 103 is connected by a passage 115 to a brake cylinder pressure chamber 116 of the equalizing valve. A piston 117 separates the brake cylinder pressure chamber 116 from the brake pipe chamber 31. In the chamber 31 is arranged a light spring 118 which engages a stem of the piston 117 and tends to force the piston toward the brake cylinder pressure chamber 116. The stem of the equalizing valve piston carries the equalizing valve 119 and said valve normally closes a port and passage 120 leading into the brake cylinder chamber 116. This equalizing valve is inoperative at all times except after there has been an equalization of brake cylinder and brake pipe pressures, as will be more fully hereinafter described. It is manifest that the superior pressure in chamber 31 will hold the equalizing valve 119 in position to close the port 120 and said valve will be moved to open said port only when the pressure in the brake cylinder chamber 116 is slightly superior to the brake pipe pressure in chamber 31.

The brake cylinder release valve 113 is arranged to be lifted from its seat by the stem 121 of a release piston 122. The release piston is mounted to reciprocate in a chamber 123. Between the release valve and the piston chamber 123 is an exhaust chamber 124 which is in direct communication with an atmospheric port 125. The valve 113 controls communication between the chamber 112 and the exhaust chamber 124. When the supplemental slide valve is in service position chamber 123 is connected to atmosphere by passage 126, port 127 in the main slide valve seat, port 128 of the main slide valve, cavity 129 of the supplemental slide valve, and port 130 of the main slide valve, this latter port being in communication with an exhaust port 131 which leads direct to atmospheric port 132. This will insure the seating of valve 113.

When the supplemental slide valve is in service position the charging port 33—33ª is in register with a branch port 34ª in the main slide valve so that brake pipe air may pass from the main slide valve chamber to passage 35, and thence to the service reservoir if at any time upon a service application the service reservoir pressure is below the brake pipe pressure in chamber 1. The check valve 37 prevents air passing from the service reservoir to the main valve chamber through passage 35.

The pilot valve acts as a brake cylinder pressure maintaining valve. Should the brake cylinder pressure leak down when the pilot valve is in service lap position the emergency reservoir pressure in chamber 61 will move the diaphragms upwardly and thereby place the pilot valve in service position and brake cylinder pressure will again be built up to the required degree, whereupon the pilot valve will again be moved to service lap position. In the service lap position of the supplemental slide valve brake pipe pressure will be maintained in chamber 82 of the service feed valve through port 79, said port being provided with a foot or extension for that purpose. This will hold the service feed valve in service position with the supplemental slide valve in service position.

If it be desired to increase the brake cylinder pressure a further reduction in brake pipe pressure must be made, whereupon the operation just described will be repeated so that the brake cylinder pressure may be increased in steps, if desired, up to the point of equalization of brake pipe pressure with auxiliary reservoir pressure.

In the service position of the supplemental slide valve 11 the auxiliary reservoir will be connected to the main slide valve chamber as hereinbefore described, so that auxiliary reservoir pressure will be reduced with the brake pipe pressure whenever the brake pipe is reduced with the supplemental slide valve in service position.

When the pressures on opposite sides of the main actuating piston 2 have equalized the spring 16 will move the supplemental slide valve back to service lap position as shown in Fig. 7.

When the supplemental slide valve 11 is in service position the quick release chamber 164 will be vented to atmosphere, as hereinafter described.

*Equalizing valve.*

The equalizing valve mechanism H will remain inoperative, that is to say, will remain in its normal position so long as brake pipe pressure in chamber 31 is higher than the brake cylinder pressure in chamber 116. The brake pipe pressure, as hereinbefore pointed out, enters chamber 31 through passage 30 which leads to the main valve chamber 1. The spring 118 assists the pressure in chamber 31 in holding the equalizing piston 117 against its normal stop with the valve 119 closing port and passage 120. The normal position of the equalizing valve is shown in Fig. 1. Its operated position is shown in Fig. 8.

When the brake pipe pressure in the main valve chamber 1 has been reduced slightly below brake cylinder pressure in chamber 116 the latter pressure will force the equalizing piston inwardly thereby uncovering port 120 and closing communication between chamber 31 and port and passage 32. When port 120 is open brake cylinder pressure may flow through port and passage 32 to the actuating chamber 63 of the pilot valve and said chamber 63 is cut off from the brake pipe. When the communication between the brake pipe and the actuating chamber 63 of the service application pilot valve has been cut off or interrupted the pilot valve is then non-responsive to variations in brake pipe pressure. The service position of the pilot valve connects the actuating chamber 63 to the brake cylinder. It is clear, therefore, that after the operation of the equalizing valve the pilot valve is ineffective to connect the brake pipe to the brake cylinder. The service reservoir, however, may be connected to the brake cylinder by the pilot valve so that the pilot valve in service position will feed air from the service reservoir to the brake cylinder, and thereby maintain brake cylinder pressure notwithstanding the fact that the brake pipe pressure is reduced below the brake cylinder pressure

Release after service.

*Quick release.*—To effect a release of the brakes after a service application, the brake pipe pressure must be increased in the usual manner through the manipulation of the engineer's brake valve. The increased brake pipe pressure will flow into chambers 1 and 1$^a$ from chamber 22. The increase in pressure in chamber 1 will force the piston 2 and the supplemental slide valve to normal release and charging position, as shown in Fig. 3. In the release position of the supplemental slide valve the port 128 of the main slide valve is connected to port 133 of the supplemental slide valve. Port 133 is connected by passage 134 to port 135 of the supplemental slide valve and this latter port registers with port 136 of the main slide valve. Port 136 is in communication with port and passage 137 which leads to a port 138 in the seat of the release-governing valve 26. In the release-governing valve is formed a port 139 which, in the quick-release position of said valve as shown in Fig. 3, places port 138 in communication with chamber 29. Therefore air will flow from chamber 29 through port 139 and the connected ports and passages to the chamber 123 and force the piston 122 upwardly and open the release valve 113. The brake cylinder pressure will exhaust through passage 103, the exhaust chamber 124 and the atmospheric port 125.

In the release position of the supplemental slide valve cavity 86 connects port 87 to port 85 so that air from chamber 82 of the service feed valve will be connected to atmosphere through passage 83, ports 84 and 85, cavity 86, ports 87 and 88, passage 89, port 90 of the release-governing valve seat and passage 91 of the release-governing valve, this latter passage leading to the operating slot 27$^a$. This will permit the brake pipe pressure in chamber 80 to force the piston 81 upwardly and carry the service feed valve 94 into position to close the service feed passage 98.

The retention chamber 74 of the pilot valve structure is connected by passage 140 to a port 141 in the main slide valve seat. In the main slide valve is formed a cavity 142 which, in the normal release and service position of the main slide valve, connects port 141 with a port 143. Port 143 is connected by passage 144 to a port 145 in the seat of the release-governing valve. In the release-governing valve is a port 146 which, in the quick-release position of the release-governing valve, connects port 145 to the port and passage 91 of the release-governing valve, and through said port and passage to the operating slot 27$^a$. Air from the retention chamber 74 may flow through passage 140 and then through the connected ports and passages just described to atmosphere, through the operating slot 27$^a$. This exhaust passage is open at all times except in emergency position of the main slide valve when the release-governing valve is in quick-release position. When the quick-release valve is in graduated-release position exhaust port 91 is closed.

The increased brake pipe pressure in chamber 1 will flow through passage 30, chamber 31 of the equalizing valve and passage 32 to the actuating chamber 63, as hereinbefore described. The increased pressure in chamber 63 will move the diaphragm downwardly, with the result that the pilot valve 77 will be moved downwardly to release position. In the release position of this valve brake cylinder pressure will be exhausted through passage 102, port 101 in the pilot valve seat, cavity 147 of the pilot valve, port 148 of the pilot valve seat, passage 149, port 150 in the main slide valve seat, port and passage 151 and restricted port 151$^a$ of the main slide valve, exhaust port 152 and atmospheric port 153. This release of brake cylinder pressure through the pilot valve will be described in detail in connection with the description of the graduated-release operation of the control valve.

The combined quick-release and emergency valve 59 is adapted to be engaged by an adjustable screw in the substantially horizontal arm of a bell-crank lever 154. The downwardly extending end of this lever is operatively connected to the stem of a quick-release and emergency plunger 155. This plunger is mounted to reciprocate in a chamber 156. The lever 154 is mounted in a chamber 157 which is connected by a passage 158 to the chamber 1$^a$ in the normal release and service position of the emergency piston 12. In this passage is a restriction plug which regulates the flow of air through said passage. Brake pipe pressure will be always present in chamber 157 and will operate against the outer face of the plunger 155. The chamber 156 is connected by a passage 159 to a port 160 in the main slide valve seat. This port registers with a port 161 in the main slide valve and this latter port is in register with a cavity 162 in the supplemental slide valve. Cavity 162 connects with a port 161$^a$ in the main slide valve and said port is in register with a port and passage 163 which leads to the seat of the release-governing valve. A cavity 163ª in the release-governing valve connects port 163 with a port and passage 164ª which leads to a quick-release chamber 164. The chamber 156 will be connected to the quick-release chamber 164 so that the pressure on the inner side of the plunger 155 will be quickly reduced, thereby permitting the pressure in chamber 157 on the outer side of the plunger to force the plunger inwardly against the tension of spring 165 (see Fig. 3). The inward movement of the plunger will result in lifting the quick-release valve 59 from its seat. Emergency reservoir air will flow from chamber 58 into chamber 157 and thence through passage 158 to the chamber 1ª. From this chamber the pressure will flow to the brake pipe. This will result in a rapid rise in brake pipe pressure and a quick serial release action of the control valves throughout the train.

The quick-release plunger 155 is formed with a small leak port 155ª through which air will leak from chamber 157 into chamber 156. When the pressures on the opposite sides of the plunger have equalized, the spring 165 will move the plunger outwardly to its normal position and thereby permit the valve 59 to close. The leak port 155ª will govern the time during which the quick-release valve will remain open, and consequently govern the amount of emergency reservoir air that will flow to the brake pipe during quick-release operations.

If, during the release period, there should be an excessive pressure in chamber 1, the piston 2 and the supplemental slide valve will be carried over to retarded release and restricted recharging position, as shown in Fig. 5. In this position the normal stop 4 has been forced inwardly against the pressure of the spring 5. The extension port 129ª of the supplemental slide valve is moved into register with port 128 so that pressure in chamber 123 will be exhausted to atmosphere through port 130 in the main slide valve, port 131 of the main slide valve seat, and atmospheric port 132. This will permit the main brake cylinder pressure releasing valve 113 to close, thus preventing the escape of brake cylinder pressure through the exhaust chamber 124 and atmospheric port 125. During this period of excessive brake pipe pressure the exhaust of brake cylinder pressure will be controlled entirely through the pilot valve, the pilot valve being in release position at this time. The release of brake cylinder pressure takes place through the pilot valve as hereinbefore described. During the period of excessive brake pipe pressure in chamber 1 retarded recharging of the reservoirs will take place as hereinbefore described.

The quick-release chamber 164 will be vented to atmosphere whenever the supplemental valve 11 is moved to service position (see Fig. 2). With the supplemental valve in service position air from chamber 164 will flow through passage 164ª, cavity 163ª in the release-governing valve, port and passage 163, port 161ᵉ in the main slide valve, port and passage 162ª of the supplemental slide valve, which port and passage is in communication with port 151 of the main slide valve. As hereinbefore described, port 151 is in communication with the atmospheric port 153 through the restricted port 151ª.

*Release after service.*

*Graduated release.*—The control valve is adjusted for graduated-release operations by moving inwardly the release-governing valve 26 to the position shown in Fig. 6.

To effect a graduated release of the brakes the brake pipe pressure must be increased in the usual manner a predetermined amount, and the increased brake pipe pressure must be less than the full running pressure or full charging pressure. The increase in brake pipe pressure in chamber 1 will move the piston 2 and the supplemental slide valve to release position, as hereinbefore described. The increased pressure in chamber 1 will flow through the charging ports and passages to the reservoirs and also from said chamber 1 through passage 30, chamber 31, and passage 32 into the actuating chamber 63. The diaphragms will be moved downwardly and the valve 77 will be moved to release position, as hereinbefoe described. In the release position of the valve 77 port 101 is connected by port and passage 147 of the pilot valve to the exhaust port 148. Brake cylinder pressure will be released through passage 102, port 101, port and passage 147, port 148, passage 149, and thence through the main slide valve port 151 to atmospheric port 153. The retention chamber 74 is connected by a passage 166 to a port in the seat of the pilot valve and is connected by passage 147 to the exhaust port 148, so that any air in the retention chamber may flow to atmosphere through passage 149, as just described. Port 148 is connected by a short passage 167 to the retention chamber, and in said passage is a restriction plug. This passage is open at all times to the passage 149 so that air from the retention chamber may flow to atmosphere at all times except in the emergency position of the main slide valve, regardless of the position of the pilot valve 77. Pressure in the equalizing chamber 73 will flow to atmosphere through passage 107 into passage 102 and thence to atmosphere as hereinbefore described.

The release-governing valve 26 is formed with a cavity 168 which, in the graduated-release position of said valve, connects a port 169 to port 138. Port 169 leads to atmosphere so that chamber 123 below piston 122 will be open to atmosphere when the supplemental slide valve is in release position. This will prevent the opening of the main brake cylinder release valve 113 in the release position of the supplemental slide valve. The port and passage 91 will be closed in the graduated release position of the valve 26. When the release governing valve 26 is in graduated release position port 163 is closed. This traps air in the chamber 156. The pressures will equalize on opposite sides of the plunger 155 through the leak port 155ª and the plunger will be held in position to prevent the opening of valve 59 when the supplemental slide valve is moved to release position. Cavity 163ª in the release-governing valve will connect port and passage 164ª with port 145 so that the retention chamber 74 will be connected through passage 140 and the connected ports and passages to the quick-release chamber 164. The volume of chamber 164 will be added to the volume of the retention chamber in the graduated-release position of the release-governing valve. A port 171 in the release-governing valve will be moved into register with the port 90, port 171 connecting the port 90 to the chamber 29. Brake pipe air will therefore flow through passage 89 and the connected ports and passages to the chamber 82 of the service feed valve. This will maintain the service feed valve in open position while the supplemental slide valve is in release position. As hereinbefore described the service feed valve is moved to open position when the supplemental slide valve is in service position. When the release-governing valve is in graduated-release position the service feed valve remains open in all positions of the supplemental slide valve.

In the passage 140 is arranged a check valve 172 which seats toward the retention chamber. This valve is held off its seat by a light spring so that air may pass through passage 140 and freely around the check valve 172 in quick-release operations of the control valve. When the release-governing valve is moved to graduated-release position the chamber 164 is connected to the retention chamber 74. If chamber 164 is charged with high-pressure air when the release-governing valve is shifted to graduated-release position, check valve 172 will be seated. During cycling operations pressure will be gradually built up in chamber 164 and this pressure would tend to seat the valve 172 when the pressure from chamber 74 leaked down to atmosphere through the passages 167 and 149. To provide means whereby this air from chamber 164 may escape to atmosphere a by-pass passage 173 is arranged around the check valve 172 so that air may leak around said check valve to the chamber 74. From chamber 74 the air may leak down to atmosphere through the restricted passage 167 and passage 149 as hereinbefore described. If the high-pressure air from chamber 164 were permitted to flow freely into chamber 74 the pilot valve 77 would be moved to application position.

When the pressure in chamber 73 has been reduced sufficiently to permit the undisturbed emergency reservoir pressure in chamber 61 to move the diaphragm structure and the valve 77 upwardly to lap position, the flow of air from chamber 73 and the brake cylinder will be stopped. The pressure in the actuating chamber 63 is increased a predetermined amount and the pressure in chamber 73 must be reduced a predetermined ratio to the increase of pressure in chamber 63. As hereinbefore pointed out, this ratio is approximately two-and-one-half to one, so that an increase of five pounds in chamber 63 would require a reduction of pressure of approximately twelve and one-half pounds in chamber 73 and in the brake cylinder before the undisturbed emergency reservoir pressure in chamber 61 will move the valve 77 to lap position. The pressure in chamber 116 will be reduced to an equality with the pressure in the brake cylinder.

If it be desired to make a further reduction of brake cylinder pressure a further increase in brake pipe pressure will be made and the release operation will then be repeated. If it be desired to increase the brake cylinder pressure the brake pipe pressure will be reduced and the application operation will be repeated in the same manner as hereinbefore described.

When the pilot valve 77 is in release position brake cylinder pressure will flow into the retention chamber 74 and then through passage 140 and the connected ports and passages to the chamber 164. Pressure will continue to build up in the retention chamber 74 so long as valve 77 is in release position, and the pressure in said chamber will exert an upward force on the diaphragm $b$ in opposition to the pressure in chamber 73. The amount of pressure which will flow into chamber 74 will depend upon the length of time the valve 77 is held in release position. When the valve 77 is moved to lap position the pressure in chamber 74 is trapped therein for a limited time. It may flow out through passage 167 and the restriction plug therein and thence through passage 149 and the connected ports and passages to the atmospheric port 153. The pressure in chamber 74 will blow down to atmosphere if the release valve 77 is held in lap position for any considerable period. This pressure will also blow down to atmosphere if the release valve is held in release position a sufficient period to permit the brake cylinder pressure to blow down to atmosphere. The purpose of permitting air to flow into chamber 74 is to provide means for building up brake cylinder pressure higher than the predetermined two-and-one-half to one ratio during cycling operations. As is well known, "cycling" consists of rapidly alternating applications and releases and is usually resorted to when the train is traveling down grade. If the cycling operations are slow with a considerable period between the application and release operations, the pressure in chamber 74 will blow down; and if the periods are long the pressure in chamber 74 will be reduced to atmospheric pressure. When, however, the cycling operations are rapid, as when the train is traveling down a heavy grade, the pressure will be built up in chamber 74. The pressure remaining in chamber 74 when the valve 77 is moved to application position will make it necessary to build up a pressure in chamber 73 greater than the two-and-one-half to one ratio hereinbefore referred to, because the pressure in chamber 73 must now be great enough to overcome the upward force exerted on the diaphragm $b$ by the pressure in chamber 74. This will result in the build-up of a higher brake cylinder pressure than would be possible if there were no pressure in chamber 74. The more rapid the cycling operations the greater the pressure retained in chamber 74 will be and, therefore, the greater the pressure must be in chamber 73 in order to balance the increase in pressure in chamber 74. This, of course, results in a higher brake cylinder pressure.

The port 144 in the seat of the release-governing valve is connected to an exhaust port 174 and said exhaust port is normally closed by a plug 175. When it is desired to operate the control valve in graduated release and without the pressure build-up during cycling operations, the plug 175 is removed. This provides a free exhaust of brake cylinder pressure through passage 140 and the connected ports and passages to port 144 in the seat of the release-governing valve, and thence to atmosphere through port 174. There will, therefore, be no build-up of pressure in the retention chamber 74 and the control valve will operate in graduated release without the pressure build-up during cycling operations.

*Emergency application.*

An emergency application of the brakes is effected by an emergency reduction of brake pipe pressure in the usual manner. An emergency reduction of brake pipe pressure in chamber 22 will result in a corresponding reduction of pressure in supplemental brake pipe chamber 1ª, because of the free open communication between chambers 22 and 1ª. There also will be a reduction of pressure in chamber 1 through the passage 23 and the restriction plug 24, but this reduction in chamber 1 will not be as great as the reduction in chamber 1ª. The piston 2 and the supplemental slide valve will be moved inwardly or toward the right to the limit of their travel. The emergency piston 12 will be moved toward the right by the pressure in chamber 1, the service stop spring 16 being compressed. The piston 12 carries a gasket on its outer face which seals on the annular rib 20. This prevents any leakage from chamber 1 around the piston 12. The movement of the piston 12 will carry the main slide valve to emergency position, as shown in Fig. 4. The pressure in the auxiliary reservoir chamber 6 will hold the supplemental slide valve in its inner position, and the pressure in chamber 1 will hold the main slide valve in emergency position. The ports and passages in the supplemental slide valve have no function in the emergency application; therefore the movement of this valve in its inner position in emergency applications is an idle movement.

The movement of the main slide valve to emergency position closes the charging port 23ᵇ and prevents the escape of air from the main valve chamber 1 back to the brake pipe. Of course, there will be a reduction of pressure in chamber 1 before the port 23ᵇ is closed by the main slide valve. The movement of the emergency piston to emergency position will carry said piston beyond the port leading into the passage 158, so that passage 158 will then be connected to the main valve chamber 1 instead of to the supplemental brake pipe chamber 1ª.

The auxiliary reservoir chamber 6 is connected by passage 50 and by passage 176 to a chamber 177 below a valve seat 178. Below this valve seat is arranged a valve 179 which is normally pressed upwardly by a spring 180. Above the chamber 177 is formed a chamber 181 which normally is in open communication with chamber 177 past the valve 179. In all operations of the control valve except emergency the valve 179 is held from its seat by auxiliary reservoir pressure in chamber 177. Connected to chamber 181 is a passage 182 which leads to a port 183 in the main slide valve seat. When the main slide valve is in emergency position a cavity 184 therein connects port 183 with a port 185 and said port leads into a passage 186 which leads into a chamber 187. The port 185, except in the emergency position of said valve, is open to atmosphere through port 151ᵇ and the connected ports 151 and 151ª to prevent any pressure building up in chamber 187. In this chamber is mounted a piston 188 which is normally held in its inner and inactive position by spring 189, as shown in Fig. 4ª. Piston 188 is provided with an outwardly extending stem 190 to which is operatively connected the upper end of one arm of a pivoted bell-crank lever 191. The other arm of said lever engages an emergency brake pipe vent valve 192. This valve is located in chamber 22 and controls a large exhaust port 193. Said valve is held seated in all operations of the control valve, except emergency operations, by a spring 194. When auxiliary reservoir air is admitted into the chamber 187 the piston 188 will be moved outwardly and the emergency brake pipe vent valve will be opened, thereby permitting brake pipe pressure to flow to atmosphere through the large exhaust port 193.

In the emergency position of the main slide valve port 161ª will register with port 160. A branch port 161ᵇ will place port 161 in communication with an atmospheric port 195 so that passage 159 and chamber 156 will be connected to atmosphere. Air in chamber 156 will be exhausted and the pressure in chamber 157 will move the plunger 155 and open the quick-release and emergency valve 59. Emergency reservoir air will flow into chamber 157 and then through passage 158 into the main slide valve chamber 1. The main slide valve, in moving to emergency position, uncovers port 196, which port leads directly into cavity 54 so that emergency reservoir and auxiliary reservoir will equalize. Port 53 is connected by port and passage 197 to a port 198 and this latter port is connected by passage 199 to a chamber 200 so that the combined emergency and auxiliary reservoir air will flow from the cavity 54 into chamber 200. Above the chamber 200 is a small chamber 201 and in said chamber is arranged a check valve 202 which seats toward the chamber 200, a light spring holding said check valve to its seat. Chamber 201 is connected by a passage 203 to the brake cylinder passage 103. Emergency reservoir air will therefore flow from chamber 200 past check valve 202 and through passages 203 and 103 to the brake cylinder.

Port 198 is connected by a passage 204 to the passage 149. Passage 149 is connected by a passage 205 to a chamber 206 below the check valve 179, so that emergency reservoir air will flow to said chamber 206 and close the valve 179. This will prevent further flow of auxiliary reservoir air to the chamber 187. In the passage 204 is a restriction plug to limit the flow of air to the chamber 206. Emergency reservoir air will flow from passage 204 through passage 149 to the pilot valve, but this will have no effect upon the operation of the control valve. The piston 188 is formed with a small leak port 207 to permit the air in chamber 187 to leak to atmosphere. When this pressure has been sufficiently reduced the spring 189 will force the piston inwardly and thereby permit the vent valve 192 to close. Valve 202 will close when the emergency reservoir air has equalized into the brake cylinder.

In the emergency position of the main slide valve port 130 will connect port 127 to atmospheric port 131. This will vent chamber 123 to atmosphere so that the main brake cylinder release valve 113 will be held to its seat to close the main brake cylinder exhaust port.

When the main slide valve moves to emergency position the air in chambers 80 and 82 of the service feed valve will be trapped therein; ports 64 and 84 are closed and there will be no movement of the service feed valve. If the control valve is operating in quick release the service feed valve will remain closed. If it is operating in graduated release the service feed valve will remain open. However, as the pilot valve will not move to service position in the emergency operation, the service reservoir air will not be used in emergency applications but will be sealed and held in the service reservoir.

As hereinbefore pointed out, emergency reservoir air may flow from the emergency reservoir E through passage 47 past check valve 56 and through passage 57 to chamber 58.

*Release after emergency application.*

A release after an emergency application is effected in the usual manner by increasing the brake pipe pressure. An increase in brake pipe pressure in chamber 22 will result in a corresponding increase in pressure in chamber 1ª on the outer side of the piston 12. When the pressure in chamber 1ª, plus the energy exerted by the spring 16, is sufficient to overcome the opposing pressure in chamber 1, the main slide valve will be moved back to its normal position thereby uncovering port 23ᵇ and connecting passage 158 to chamber 1ª. The increasing brake pipe pressure will now flow into chamber 1 and will force the piston 2 and the supplemental slide valve to release and charging position, whereupon the recharging of the reservoir will take place as hereinbefore described and the brake cylinder pressure will be released to atmosphere. When the main and supplemental slide valves are in release position the passage 205 will be connected to atmospheric port 153 through port 150 which leads into port 151. At this time port 151 is connected to port 153 through restricted port 151ª which is in communication through port 152 with the atmospheric port 153. This permits the chamber 206 to blow down to atmosphere thereby ensuring the unseating of valve 179.

When the control valve is operating in quick release the movement of the main and supplemental slide valves to release and recharging position admits brake pipe air from the release-governing valve chamber 29 into the chamber 123, thereby forcing the piston 122 to open the main brake cylinder release valve 113 as hereinbefore described. The chamber 200 under the valve 202 will be vented to atmosphere through the connected ports and passages leading to atmospheric port 153, thereby ensuring the seating of the valve 202.

What I claim is:—

1. In an air brake apparatus, a brake pipe, an emergency reservoir, an auxiliary reservoir, a service reservoir, a control valve comprising a slide valve chamber, a slide valve therein, a piston connected to said valve, means to permit brake pipe presssure to operate on one side of said piston, means to permit auxiliary reservoir pressure to operate on the other side of said piston, a pilot valve subject to brake pipe, brake cylinder and emergency reservoir pressures, a normally closed service feed valve interposed between the service reservoir and the pilot valve, and an equalizing valve subject to brake pipe and brake cylinder pressures and controlling communication between the brake pipe and the brake pipe chamber of the pilot valve.

2. In an air brake apparatus, a brake pipe, an emergency reservoir, an auxiliary reservoir, a service reservoir, a control valve comprising a slide valve chamber, a slide valve therein, a piston connected to said valve, means to permit brake pipe pressure to operate on one side of said piston, means to permit auxiliary reservoir pressure to operate on the other side of said piston, a pilot valve subject to brake pipe, brake cylinder and emergency reservoir pressures, a normally closed service feed valve interposed between the service reservoir and the pilot valve, means adapted to operate when the slide valve is in service position to open the service feed valve, and means whereby the pilot valve in service position will connect the service reservoir to the brake cylinder.

3. In an air brake apparatus, a brake pipe, an emergency reservoir, an auxiliary reservoir, a service reservoir, a control valve comprising a slide valve chamber, a slide valve therein, a piston connected to said valve, means to permit brake pipe pressure to operate on one side of said piston, means to permit auxiliary reservoir pressure to operate on the other side of said piston, a pilot valve subject to brake pipe, brake cylinder and emergency reservoir pressures, a normally closed service feed valve interposed between the service reservoir and the pilot valve, means adapted to operate when the slide valve is in service position to open the service feed valve, and means whereby the pilot valve in service position will connect the service reservoir and the brake pipe to the brake cylinder.

4. In an air brake apparatus, a brake pipe, an emergency reservoir, an auxiliary reservoir, a service reservoir, a control valve comprising a slide valve chamber, a slide valve therein, a piston connected to said valve, means to permit brake pipe pressure to operate on one side of said piston, means to permit auxiliary reservoir pressure to operate on the other side of said piston, a pilot valve subject to brake pipe, brake cylinder and emergency reservoir pressures, a normally closed service feed valve interposed between the service reservoir and the pilot valve, means adapted to operate when the slide valve is in service position to open the service feed valve, means whereby the pilot valve in service position will connect the service reservoir to the brake cylinder, and means operating when the slide valve returns to release position to close said service feed valve.

5. In an air brake apparatus, a brake pipe, an auxiliary reservoir, a service reservoir, a control valve comprising a slide valve chamber, a slide valve therein, a piston connected to said valve, a pilot valve subject to brake pipe and brake cylinder pressures, a normally closed service feed valve interposed between the service reservoir and the pilot valve, and an equalizing valve subject to brake pipe and brake cylinder pressures and controlling communication between the brake pipe and the brake pipe chamber of the pilot valve.

6. In an air brake apparatus, a brake pipe, a service reservoir, a control valve comprising a slide valve chamber, a slide valve therein, a piston connected to said valve, a pilot valve subject to break pipe and brake cylinder pressures, a normally closed service feed valve interposed between the service reservoir and the pilot valve, means adapted to operate when the slide valve is in service position to open the servic feed valve, and means whereby the pilot valve in service position will connect the service reservoir to the brake cylinder.

7. In an air brake apparatus, a brake pipe, a service reservoir, a control valve comprising a slide valve chamber, a slide valve therein, a piston connected to said valve, a pilot valve subject to brake pipe and brake cylinder pressures, a normally closed service feed valve interposed between the service reservoir and the pilot valve, means adapted to operate when the slide valve is in service position to open the service feed valve, and means whereby the pilot valve in service position will connect the service reservoir and the brake pipe to the brake cylinder.

8. In an air brake apparatus, a brake pipe, a service reservoir, a control valve comprising a slide valve chamber, a slide valve therein, a piston connected to said valve, a pilot valve subject to brake pipe and brake cylinder pressures, a normally closed service feed valve interposed between the service reservoir and the pilot valve, means adapted to operate when the slide valve is in service position to open the service feed valve, means whereby the pilot valve in service position will connect the service reservoir to the brake cylinder, and means operating when the slide valve returns to release position to close said service feed valve.

9. In an air brake apparatus, a brake pipe, a service reservoir, a control valve comprising a slide valve chamber, a slide valve therein, a piston connected to said valve, a pilot valve subject to brake pipe and brake cylinder pressures, a normally closed service feed valve interposed between the service reservoir and the pilot valve, means adapted to operate when the slide valve is in service position to open the service feed valve, and means whereby the pilot valve in service position will connect the service reservoir to the brake cylinder and to the brake cylinder chamber of the pilot valve.

10. In an air brake apparatus, a brake pipe, a service reservoir, a control valve comprising a slide valve chamber, a slide valve therein, a piston connected to said valve, a pilot valve subject to brake pipe and brake cylinder pressures, a normally closed service feed valve interposed between the service reservoir and the pilot valve, means adapted to operate when the slide valve is in service position to open the service feed valve, and means whereby the pilot valve in service position will connect the service reservoir and the brake pipe to the brake cylinder and to the brake cylinder chamber of the pilot valve.

11. In an air brake apparatus, a brake pipe, a service reservoir, a control valve comprising a slide valve chamber, a slide valve therein having a service position and a service lap position, a piston connected to said valve, a pilot valve subject to brake pipe and brake cylinder pressures, a normally closed service feed valve interposed between the service reservoir and the pilot valve, means adapted to operate when the slide valve is in service position and in service lap position to open the service feed valve, and means whereby the pilot valve in service position will connect the service reservoir to the brake cylinder.

12. In an air brake apparatus, a brake pipe, a service reservoir, an emergency reservoir, a control valve comprising a main slide valve chamber, a main slide valve therein and movable to emergency position, a supplemental slide valve superposed on the main slide valve and movable to service position, a main actuating piston connected to the supplemental slide valve, a pilot valve subject to brake pipe and brake cylinder pressures, a normally closed service feed valve interposed between the service reservoir and the pilot valve, means adapted to operate when the supplemental slide valve is in service position to open the service feed valve, means whereby the pilot valve in service position will connect the service reservoir to the brake cylinder, and means whereby when the main slide valve is in emergency position the service feed valve will be held closed to seal the service reservoir and the emergency reservoir will be connected to the brake cylinder.

13. In an air brake apparatus, a brake pipe, an emergency reservoir, an auxiliary reservoir, a service reservoir, a control valve comprising a slide valve chamber, a slide valve therein, a piston connected to said valve, means to permit brake pipe pressure to operate on one side of said piston, means to permit auxiliary reservoir pressure to operate on the other side of said piston, a pilot valve subject to brake pipe, brake cylinder and emergency reservoir pressures, a normally closed service feed valve interposed between the service reservoir and the pilot valve, an equalizing valve subject to brake pipe and brake cylinder pressures and controlling communication between the brake pipe and the brake pipe chamber of the pilot valve, and means whereby the equalizing valve will be moved to cut-off communication between the brake pipe and the brake pipe chamber of the pilot valve when the brake pipe and brake cylinder pressures are equal.

14. In an air brake apparatus, a brake pipe, a service reservoir, a control valve comprising a slide valve chamber, a slide valve therein, a piston connected to said valve, a pilot valve subject to brake pipe and brake cylinder pressures, an equalizing valve subject to brake pipe and brake cylinder pressures and controlling communication between the brake pipe and the brake pipe chamber of the pilot valve, and means whereby the equalizing valve will be moved to cut-off communication between the brake pipe and the brake pipe chamber of the pilot valve when the brake pipe and brake cylinder pressures are equal.

15. In an air brake apparatus, a brake pipe, a service reservoir, a control valve comprising a slide valve chamber, a slide valve therein having a service position and a service lap position, a piston connected to said valve, a pilot valve subject to brake pipe and brake cylinder pressures, a normally closed service feed valve interposed between the service reservoir and the pilot valve, means adapted to operate when the slide valve is in service position and in service lap position to open the service feed valve, means whereby the pilot valve in service position will connect the service reservoir to the brake cylinder, an equalizing valve subject to brake pipe and brake cylinder pressures and controlling communication between the brake pipe and the brake pipe chamber of the pilot valve, and means whereby the equalizing valve will be moved to cut-off communication between the brake pipe and the brake pipe chamber of the pilot valve when the brake pipe and brake cylinder pressures are equal.

16. In an air brake apparatus, a brake pipe, a service reservoir, an auxiliary reservoir, an emergency reservoir, a control valve comprising a main slide valve chamber, a main slide valve therein, a supplemental slide valve superposed on the main slide valve and having a service position and a service lap position, a main actuating piston connected to the supplemental slide valve, a brake pipe connection with the main valve chamber, means for applying the auxiliary reservoir pressure to the outer side of the said main piston, an emergency piston operating in a supplemental brake pipe chamber, means operatively connecting said emergency piston to the main slide valve, a pilot valve subject to brake pipe emergency reservoir and brake cylinder pressures, a normally closed service feed valve interposed between the service reservoir and the pilot valve, means adapted to operate when the slide valve is in service position and in service lap position to open the service feed valve, means whereby the pilot valve in service position will connect the service reservoir to the brake cylinder, an equalizing valve subject to brake pipe and brake cylinder pressures and controlling communication between the main valve chamber and the brake pipe chamber of the pilot valve, means whereby the equalizing valve will be moved to cut-off communication between the main valve chamber and the brake pipe chamber of the pilot valve when the brake pipe and brake cylinder pressures are equal, and means whereby the supplemental slide valve in service position will connect the auxiliary reservoir to the main valve chamber and the pilot valve in service position will connect the main valve chamber to the brake cylinder.

17. In an air brake apparatus, a brake pipe, a service reservoir, a control valve comprising a slide valve chamber, a slide valve therein, a piston connected to said valve, a pilot valve, means to move said pilot valve to service position upon a service reduction of brake pipe pressure, an equalizing valve subject to brake pipe and brake cylinder pressures and controlling communication between the brake pipe and the pilot valve, means whereby the equalizing valve will be moved to cut-off communication between the brake pipe and the pilot valve when the brake pipe and brake cylinder pressures are equal so that further reductions of brake pipe pressure will be ineffective to cause the pilot valve to move to service position, and means whereby the pilot valve in service position will connect the service reservoir to the brake cylinder.

18. In an air brake apparatus, a brake pipe, a service reservoir, a pilot valve, means to move said pilot valve to service position upon a reduction of brake pipe pressure, an equalizing valve subject to brake pipe and brake cylinder pressures and controlling communication between the brake pipe and the pilot valve, and means whereby the equalizing valve will be moved to cut-off communication between the brake pipe and the pilot valve when the brake pipe and brake cylinder pressures are equal so that further reductions of brake pipe will be ineffective to cause the pilot valve to move to service position, and means whereby the pilot valve in service position will connect the service reservoir to the brake cylinder.

19. In an air brake apparatus, a brake pipe, a service reservoir, a control valve comprising a slide valve chamber, a slide valve therein having a service position and a service lap position, a piston connected to said valve, a pilot valve, means to move said pilot valve to service position upon a reduction of brake pipe pressure, a normally closed service feed valve interposed between the service reservoir and the pilot valve, means adapted to operate when the slide valve is in service position and in service lap position to open the service feed valve, an equalizing valve subject to brake pipe and brake cylinder pressures and controlling communication between the brake pipe and the pilot valve, means whereby the equalizing valve will be moved to cut-off communication between the brake pipe and the pilot valve when the brake pipe and brake cylinder pressures are equal so that further reductions of brake pipe will be ineffective to cause the pilot valve to move to service position, and means whereby the pilot valve in service position will connect the service reservoir to the brake cylinder.

20. In an air brake apparatus, a brake pipe, a service reservoir, a service application pilot valve, means to move said valve to service position upon a reduction of brake pipe pressure, an equalizing valve subject to brake pipe and brake cylinder pressures and controlling communication between the brake pipe and the service application valve, and means whereby the equalizing valve will be moved to cut-off communication between the brake pipe and the service application valve when the brake pipe and brake cylinder pressures are equal so that further reductions of brake pipe will be ineffective to cause the service application valve to move to service position, and means whereby the service application valve in service position will connect the service reservoir and the brake pipe to the brake cylinder.

21. In an air brake apparatus, a brake pipe, a service reservoir, an emergency reservoir, a service application pilot valve subject to brake pipe and brake cylinder pressures opposed to emergency reservoir pressure, an equalizing valve subject to brake pipe and brake cylinder pressures and controlling communication between the brake pipe and the service application valve, and means whereby the equalizing valve will be moved to cut-off communication between the brake pipe and the service application valve when the brake pipe and brake cylinder pressures are equal so that further reductions of brake pipe will be ineffective to cause the service application valve to move to service position, and means whereby the service application valve in service position will connect the service reservoir and the brake pipe to the brake cylinder.

22. In an air brake apparatus, a brake pipe, a service reservoir, an emergency reservoir, a control valve comprising a slide valve chamber, a slide valve therein having a service position and a service lap position, a piston connected to said valve, a pilot valve subject to brake pipe and brake cylinder pressures opposed to emergency reservoir pressure, a normally closed service feed valve interposed between the service reservoir and the pilot valve, means adapted to operate when the slide valve is in service position and in service lap position to open the service feed valve, an equalizing valve subject to brake pipe and brake cylinder pressures and controlling communication between the brake pipe and the pilot valve, means whereby the equalizing valve will be moved to cut-off communication between the brake pipe and the pilot valve when the brake pipe and brake cylinder pressures are equal so that further reductions of brake pipe will be ineffective to cause the pilot valve to move to service position, and means whereby the pilot valve in service position will connect the service reservoir to the brake cylinder.

23. In an air brake apparatus, an auxiliary reservoir, an emergency reservoir, a control valve comprising a main slide valve chamber, a main slide valve therein, a supplemental slide valve superposed on the main slide valve, a main actuating piston connected to the supplemental slide valve, a brake pipe connection with the main valve chamber, means for applying the auxiliary reservoir pressure to the outer side of the said main piston, an emergency piston operating in a supplemental brake pipe chamber, means operatively connecting said emergency piston to the main slide valve, a brake cylinder release valve, and means adapted to operate when the supplemental slide valve is in release position to open said release valve.

24. In an air brake apparatus, an auxiliary reservoir, an emergency reservoir, a control valve comprising a main slide valve chamber, a main slide valve therein, a supplemental slide valve superposed on the main slide valve, a main actuating piston connected to the supplemental slide valve, a brake pipe connection with the main valve chamber, means for applying the auxiliary reservoir pressure to the outer side of the said main piston, an emergency piston operating in a supplemental brake pipe chamber, means operatively connecting said emergency piston to the main slide valve, a brake cylinder release valve, and means adapted to operate when the supplemental slide valve is in release position to open said release valve by brake pipe air.

25. In an air brake apparatus, an auxiliary reservoir, an emergency reservoir, a control valve comprising a main slide valve chamber, a main slide valve therein, a supplemental slide valve superposed on the main slide valve, a main actuating piston connected to the supplemental slide valve, a brake pipe connection with the main valve chamber, means for applying the auxiliary reservoir pressure to the outer side of the said main piston, an emergency piston operating in a supplemental brake pipe chamber, means operatively connecting said emergency piston to the main slide valve, a brake cylinder release valve, means adapted to operate when the supplemental slide valve is in release position to open said release valve, and means adapted to operate when the supplemental slide valve is in service position to close said release valve.

26. In an air brake apparatus, an auxiliary reservoir, an emergency reservoir, a control valve comprising a main slide valve chamber, a main slide valve therein, a supplemental slide valve superposed on the main slide valve, a main actuating piston connected to the supplemental slide valve, a brake pipe connection with the main valve chamber, means for applying the auxiliary reservoir pressure to the outer side of the said main piston, an emergency piston operating in a supplemental brake pipe chamber, means operatively connecting said emergency piston to the main slide valve, a brake cylinder release valve, means adapted to operate when the supplemental slide valve is in release position to open said release valve, and means adapted to operate when the main slide valve is in emergency position to close said release valve.

27. In an air brake apparatus, an auxiliary reservoir, an emergency reservoir, a control valve comprising a main slide valve chamber, a main slide valve therein, a supplemental slide valve superposed on the main slide valve and having a normal release and charging position and a restricted release and a retarded recharging position, a main actuating piston connected to the supplemental slide valve, a brake pipe connection with the main valve chamber, means for applying the auxiliary reservoir pressure to the outer side of the said main piston, an emergency piston operating in a supplemental brake pipe chamber, means operatively connecting said emergency piston to the main slide valve, a brake cylinder release valve, means adapted to operate when the supplemental slide valve is in normal release position to open said release valve, and means adapted to be operated when the supplemental slide valve is in restricted release position to close said release valve.

28. In an air brake apparatus, an emergency reservoir, a control valve comprising a slide valve chamber, a slide valve therein, a piston connected to said valve, a combined quick release and emergency valve controlling the discharge of air from the emergency reservoir, means adapted to be operated when the slide valve is in emergency position to open said combined quick release and emergency valve to permit emergency reservoir air to flow to the brake cylinder, means adapted to be operated when the slide valve is in release position to open said valve to permit emergency reservoir to flow to the brake pipe, a release governing valve having a quick release position and a graduated release position, means whereby the release governing valve in its quick release position will cooperate with the said slide valve when said latter valve is in release position to open the quick release and emergency valve, and means whereby the release governing valve in its graduated release position will prevent the opening of the said quick release and emergency valve when the slide valve is in release position.

29. In an air brake apparatus, a brake pipe, a reservoir to supply braking pressure, a control valve comprising a slide valve chamber, a slide valve therein, a piston connected to said valve, a brake cylinder release valve, means adapted to operate when the slide valve is in release position to open said release valve, a release governing valve having a quick release position and a graduated release position, means whereby the release governing valve in its quick release position will cooperate with the said slide valve when said latter valve is in release position to open the brake cylinder release valve, and means whereby the release governing valve in its graduated release position will prevent the opening of the said brake cylinder release valve when the slide valve is in release position.

30. In an air brake apparatus, a brake pipe, a reservoir to supply braking pressure, a control valve comprising a slide valve chamber, a slide valve therein, a piston connected to said valve, a brake cylinder release valve, means adapted to operate when the slide valve is in release position to open said release valve, a release governing valve having a quick release position and a graduated release position, means whereby the release governing valve in its quick release position will cooperate with the said slide valve when said latter valve is in release position to open the brake cylinder release valve, means whereby the release governing valve in its graduated release position will prevent the opening of the said brake cylinder release valve when the slide valve is in release position, a pilot valve, means whereby an increase of brake pipe pressure will move said pilot valve to release position, and means whereby the pilot valve in release position will connect the brake cylinder to atmosphere.

31. In an air brake apparatus, a brake pipe, an emergency reservoir, a control valve comprising a slide valve chamber, a slide valve therein, a piston connected to said valve, a brake cylinder release valve, means adapted to operate when the slide valve is in release position to open said release valve, a release governing valve having a quick release position and a graduated release position, means whereby the release governing valve in its quick release position will cooperate with the said slide valve when said latter valve is in release position to open the brake cylinder release valve, means whereby the release governing valve in its graduated release position will prevent the opening of the said brake cylinder release valve when the slide valve is in release position, a pilot valve subject to brake pipe and brake cylinder pressures opposed to emergency reservoir pressures and movable to position by an increase in brake pipe pressure, and means whereby the pilot valve in release position will connect the brake cylinder to atmosphere.

32. In an air brake apparatus, an emergency reservoir, a control valve comprising a slide valve chamber, a slide valve therein, a piston connected to said valve, a combined quick release and emergency valve controlling the discharge of air from the emergency reservoir, means adapted to be operated when the slide valve is in emergency position to open said combined quick release and emergency valve to permit emergency reservoir air to flow to the brake cylinder, and means adapted to be operated when the slide valve is in release position to open said valve to permit emergency reservoir to flow to the brake pipe.

33. In an air brake apparatus, an emergency reservoir, an auxiliary reservoir, a control valve comprising a slide valve chamber, a slide valve therein, a piston connected to said valve, means to permit brake pipe pressure to operate on one side of said piston, means to permit auxiliary reservoir pressure to operate on the other side of said piston, a combined quick release and emergency valve controlling the discharge of air from the emergency reservoir, and means adapted to be operated by brake pipe air when the slide valve is in emergency position to open said emergency valve to permit emergency reservoir air to flow to the brake cylinder.

34. In an air brake apparatus, an emergency reservoir, an auxiliary reservoir, a control valve comprising a slide valve chamber, a slide valve therein, a piston connected to said valve, means to permit brake pipe pressure to operate on one side of said piston, means to permit auxiliary reservoir pressure to operate on the other side of said piston, a combined quick release and emergency valve controlling the discharge of air from the emergency reservoir, means adapted to be operated by brake pipe air when the slide valve is in emergency position to open said emergency valve to permit emergency reservoir air to flow to the main valve chamber and then to the brake cylinder, and means adapted to be operated when the slide valve is in release position to open said combined quick release and emergency valve to permit emergency air to flow to the brake pipe.

35. In an air brake apparatus, a brake pipe, a brake cylinder, a service pilot valve normally responding to variations in brake pipe pressure to admit air to the brake cylinder for a service application of the brakes and to release air from the brake cylinder, and an equalizing valve subject to brake pipe and brake cylinder pressures and operating upon a substantial equalization of the said two pressures to cut off the brake pipe from the said service pilot valve.

36. In an air brake apparatus a brake pipe, a brake cylinder, an emergency reservoir, a service pilot valve subject to brake pipe, brake cylinder and emergency reservoir pressures and normally responding to variations in brake pipe pressure to admit air to the brake cylinder for a service application of the brakes and to release air from the brake cylinder, and an equalizing valve subject to brake pipe and brake cylinder pressures and operating upon a substantial equalization of the said two pressures to cut off the brake pipe from the said service pilot valve.

37. In an air brake apparatus, a brake pipe, a brake cylinder, a control valve comprising a slide valve chamber, a slide valve therein, a piston connected to said valve, a pilot valve subject to brake pipe and brake cylinder pressures, an equalizing valve subject to brake pipe and brake cylinder pressures and controlling communication between the brake pipe and the brake pipe chamber of the pilot valve, and means whereby the equalizing valve will be moved to cut off communication between the brake pipe and the brake pipe chamber of the pilot valve when the brake pipe and brake cylinder pressures are substantially equal, and to connect the brake cylinder to the brake pipe chamber of the pilot valve.

38. In an air brake apparatus, a brake pipe; a brake cylinder; an emergency reservoir; a service reservoir; a service pilot valve subject to brake pipe, brake cylinder and emergency reservoir pressures and normally responding to variations in brake pipe pressure to admit air from the brake pipe and service reservoir to the brake cylinder for a service application of the brakes and to release air from the brake cylinder; and an equalizing valve subject to brake pipe and brake cylinder pressures and operating upon a substantial equalization of the said two pressures to cut off the brake pipe from the said service pilot valve and thereby render said valve non-responsive to variations in brake pipe pressure and inoperative to connect the brake pipe to the brake cylinder in service application position.

39. In an air brake apparatus, a brake pipe; a brake cylinder; an emergency reservoir; a service reservoir; a service pilot valve subject to brake pipe, brake cylinder and emergency reservoir pressures and normally responding to a reduction of brake pipe pressure to admit air from the brake pipe and service reservoir to the brake cylinder for a service application of the brakes, and responding to an increase of brake pipe pressure to release air from the brake cylinder; and an equalizing valve subject to brake pipe and brake cylinder pressures and operating upon a substantial equalization of the said two pressures to cut off the brake pipe from the said service pilot valve and thereby render said valve inoperative to connect the brake pipe to the brake cylinder in service application position.

40. A control valve for an air brake apparatus, comprising a casing formed with a slide valve chamber; a slide valve therein; means operated by a reduction of brake pipe pressure to move the slide valve to service position and responding to an increase of brake pipe pressure to move to release position; a service application valve normally responding to a reduction of brake pipe pressure to admit air from the brake pipe and a service reservoir to the brake cylinder for a service application of the brakes, and responding to an increase of brake pipe pressure to release air from the brake cylinder; and an equalizing valve subject to brake pipe and brake cylinder pressures and operating upon a substantial equalization of the said two pressures to cut off the brake pipe from the said service pilot valve and thereby render said valve inoperative to connect the brake pipe to the brake cylinder in service application position.

41. A control valve for an air brake apparatus, comprising a casing formed with a slide valve chamber; a slide valve therein; means operated by a reduction of brake pipe pressure to move the slide valve to service position and responding to an increase of brake pipe pressure to move to release position; a service application valve responding to a reduction of brake pipe pressure to admit air from a service reservoir to the brake cylinder for a service application of the brakes, and responding to an increase of brake pipe pressure to release air from the brake cylinder; a normally closed service feed valve interposed between the service reservoir and the service application valve; means adapted to operate when the slide valve is in service position to open the service feed valve; means whereby the service application valve in service position will connect the service reservoir to the brake cylinder; and means operating when the slide valve is in release position to close said service feed valve.

42. A control valve for an air brake apparatus, comprising a casing formed with a slide valve chamber; a slide valve therein; means operated by a reduction of brake pipe pressure to move the slide valve to service position and responding to an increase of brake pipe pressure to move to release position; a service application valve responding to a reduction of brake pipe pressure to admit air from the brake pipe and a service reservoir to the brake cylinder independently of the slide valve for a service application of the brakes, and responding to an increase of brake pipe pressure to release air from the brake cylinder; a normally closed service feed valve interposed between the service reservoir and the service application valve; means adapted to operate when the slide valve is in service position to open the service feed valve; means whereby the service application valve in service position will connect the service reservoir and the brake pipe to the brake cylinder; and means operating when the slide valve is in release position to close said service feed valve.

In testimony whereof I hereunto affix my signature.

WILLIAM ASTLE.